Dec. 24, 1946.　　　J. E. URBANY　　　2,413,087
FIRE PREVENTING SYSTEM
Filed March 1, 1943　　　2 Sheets-Sheet 1

INVENTOR.
JOHN E. URBANY,
BY HARRIS, KIECH, FOSTER & HARRIS
Clarence F. Kiech
FOR THE FIRM
Attorneys.

Patented Dec. 24, 1946

2,413,087

UNITED STATES PATENT OFFICE 2,413,087

FIRE PREVENTING SYSTEM

John E. Urbany, Los Angeles, Calif.

Application March 1, 1943, Serial No. 477,677

14 Claims. (Cl. 169—2)

My invention relates to a novel method and apparatus for protecting fluid-containing systems in the event of puncture, the protection being effected either through automatically-operating means or through signal means indicating the dangerous condition, or both. More particularly, the preferred embodiment of the invention relates to protection against fire hazards upon puncture of enclosures containing inflammable fluids.

The invention can best be exemplified with reference to the pressing problem of protecting aircraft fuel lines against disastrous fires which follow piercing thereof in combat, combustion being initiated either directly by an incendiary bullet or indirectly from other sources of ignition in the vicinity of the escaping combustible fluid. One very advantageous application of the invention is in the automatic stopping of fuel flow through a main fuel line should this line be punctured in combat because of a bullet or for any other reason. Another very important aircraft application of the invention is in the automatic control of the flow of a gasoline-air mixture by-passed from the discharge side of the supercharger to a heater serving to heat the fuselage or other portions of the airplane equipment. In this instance, the invention provides automatic protection against fire in the event the line supplying the heater is punctured. The invention will be particularly described in these capacities, as well as applied to the general problem of fluid-flow control in related systems, including storage systems.

In the following description, the term "puncture" is used in a generic sense and has reference not only to a relatively minor perforation but also to a major rupture or complete severance. Also, it has reference not only to intentional or accidental entrance of a sharp pointed instrument but to minor or major ruptures due to mechanical defects, corrosion, etc. The word "fluid," as hereinafter used, is also intended to be generic to liquids, gases, or any substance flowable through the puncture to upset the normal pressure differential. By the use of the words "fuel" or "inflammable fluid," I have reference to combustible materials in fluid state, whether or not combustion-supporting material, such as air, is present therein. By the term "fire-extinguishing fluid," I have reference to any non-combustible fluid tending to extinguish existing combustion or tending, when mixed with fuel, to form a mixture which will not burn or which will impede the normal burning of the fuel.

It is an object of the present invention to maintain normally a pressure differential across a wall separating two fluids, as by maintaining a pressure differential between spaces separated by the wall, this pressure differential changing upon puncture of the separating wall, and to employ this change in pressure differential in one way or another, as by actuation of a signal or a flow-control means, or both, or merely to effect mingling of the two fluids at the puncture, as by mingling a fire-extinguishing fluid with a fuel. Another object of the invention is to disposed one of such spaces partially or completely around the other of such spaces.

Another object of the invention is to provide two contiguous spaces respectively containing fluids, one space being disposed between the other space and the surrounding atmosphere or other surrounding medium, and to maintain normally in the intervening space such pressure (subatmosheric or superatmospheric) as will develop a pressure differential across one of the walls of the intervening space, e. g., either between the intervening space and the surrounding medium or between the intervening space and the other space. It is an object of one particularly desirable embodiment of the invention to retain a fuel in one of the spaces and a fire-extinguishing fluid in the other.

In systems in which a normal pressure differential is maintained across one of the walls of such an intervening space, puncture of such a wall will tend to modify the pressure differential. It is an object of the present invention to provide means responsive to such modification of the pressure differential and serving to actuate any suitable instrumentality, such, for example, as a warning signal, or any suitable control means, e. g., a valve controlling the flow of fluid to or from either or both of the spaces.

Another object of the invention is to provide a novel system for protecting fuel lines against fire hazard upon puncture thereof, this protection involving an immediate cutting off of the fuel flow and, if desired, the delivery of a fire-extinguishing fluid to the zone of the puncture. Other objects of the invention lie in the provision and automatic actuation of warning means upon occurrence of such puncture.

The preferred embodiment of the invention, when applied to the protection of fuel lines, comprehends the employment of inner and outer pipes spaced from each other to define an intermediate space, the fuel flowing through the space provided by the inner pipe. In this connection, the intermediate space may well be filled with a fire-extinguishing fluid, such, for example, as carbon dioxide, and it is an object of the invention to provide such a system whereby puncture of the inner pipe, whether or not accompanied by almost simultaneous puncture of the outer pipe, will supply the fire-extinguishing fluid directly and immediately to the puncture to avoid fire hazard.

Another object of the invention, particularly applicable to the protection of fuel-containing systems, is to provide for renewal of the fire-extinguishing fluid at the instant of puncture so that, if desired, a continuous stream of this fluid may be supplied to the puncture until danger of combustion has passed. This system is particularly well suited to the protection of fuel lines and may provide a normally-closed valve between the source of the fire-extinguishing fluid and its space, as well as a normally-open fuel valve supplying fuel to the other space. Upon puncture, and consequent modification in the pressure differential noted above, the means responsive to this pressure differential can be made simultaneously to close the fuel valve and open the valve admitting additional fire-extinguishing fluid to its space.

Further objects of the invention lie in the novel structural relationships and combinations hereinafter disclosed including, but not limited to, the novel concentric-tube mounting to be described.

Further objects and advantages of the invention will be evident to those skilled in the art from the following description.

Referring to the drawings, in which various embodiments of the invention are illustrated by way of example:

Figure 1:
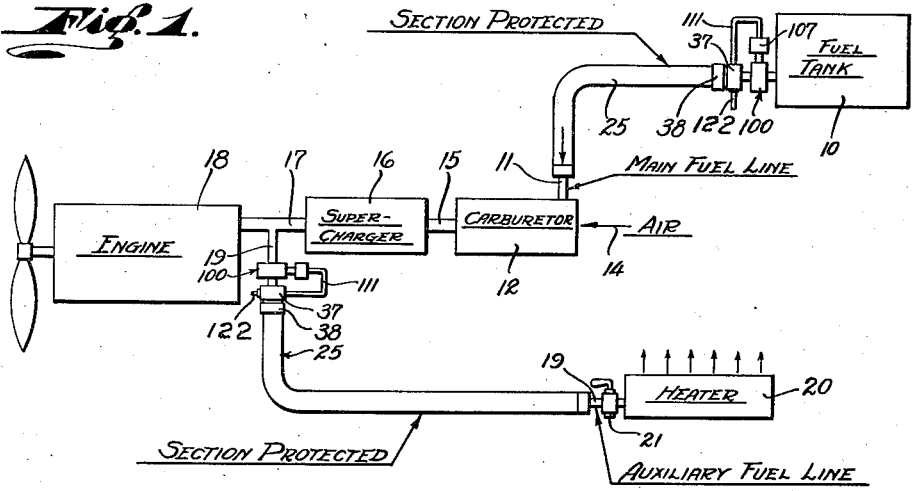
Figure 1 is a utility view, showing very diagrammatically two applications of the invention in the protection of fuel lines of an airplane.

Referring particularly to Figure 1, the numeral 10 represents the usual fuel tank or tanks of an airplane connected by a main fuel line 11 to a carburetor 12 serving to mix the fuel with a properly proportioned amount of air, the air supply being indicated diagrammatically by the arrow 14. The combustible fuel-air mixture is delivered by pipe 15 to a supercharger 16 and thence through pipe 17 to the manifold of an engine 18. It is not uncommon to by-pass a portion of the fuel-air mixture from the pipe 17 through an auxiliary fuel line 19 for other purposes. As shown in Figure 1, the pipe 19 extends to a heater 20, as controlled by a manual valve 21. Such heaters are of various types, which need not be here particularized.

Figure 2:
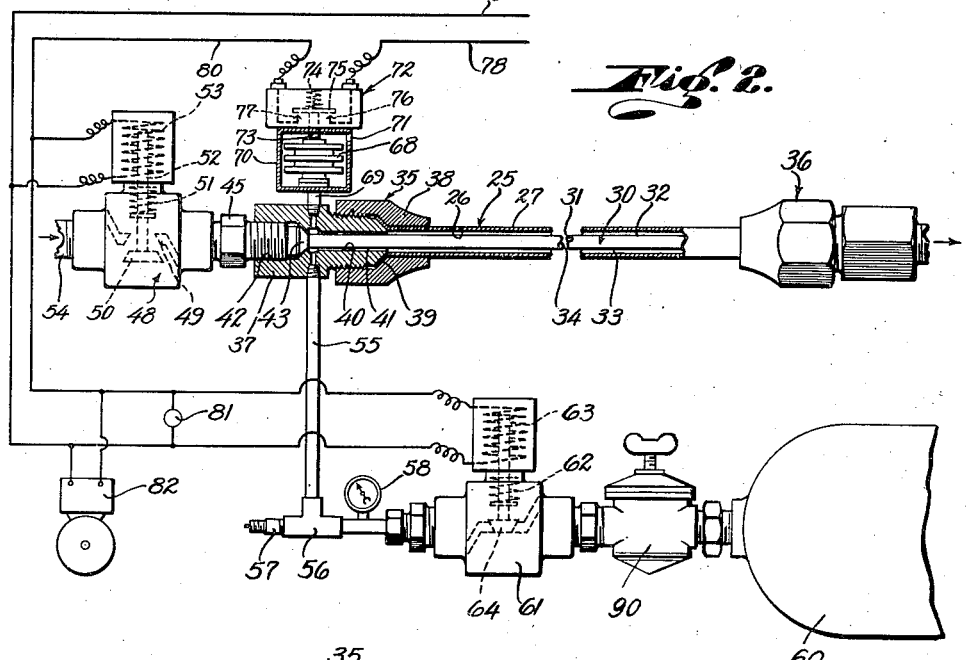
Figure 2 is a diagrammatic view, partially in section, of one embodiment of the invention.

In a system such as shown in Figure 1, the present invention may advantageously be applied to protect the main fuel line 11 or the auxiliary fuel line 19. One system of accomplishing this is shown in Figure 2. In this embodiment, the invention includes outer walls forming an outer enclosure or shell, shown in the form of an outer pipe 25 providing internal and external surfaces 26 and 27, respectively. The external surface 27 is exposed to the pressure of the atmosphere or other surrounding medium, either directly or through a coating of paint or other material, and this pressure is usually subject to variation, e. g., at a fixed altitude it may vary with changes in barometric pressure or, if the system is used in an airplane, it may vary, in addition, with changes in altitude. Disposed within the outer pipe 25 are inner walls forming an inner enclosure or shell, shown in the form of an inner pipe 30 providing internal and external surfaces 31 and 32, respectively. The external surface 32 is spaced from the internal surface 26 of the outer pipe 25 adjacent at least a portion of the periphery thereof to form an intermediate space or chamber 33. The internal surface 31 of the inner pipe 30 forms an inner space or chamber 34 which, in the illustrated embodiment, may comprise all or a part of the fuel line to be protected, the inner space carrying, for example, an inflammable fluid such as gasoline or a gasoline-air mixture.

Figure 3:
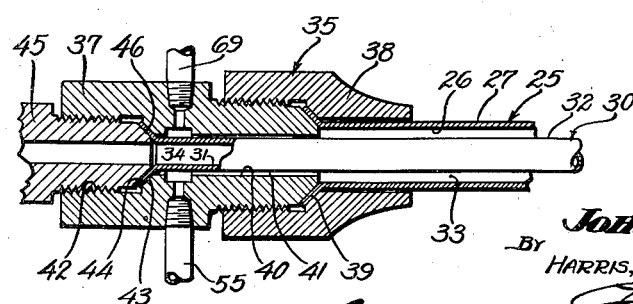
Figure 3 is an enlarged sectional view of one of the fittings shown in Figure 2.

The outer pipe 25 surrounds that portion of the inner pipe 30 which is to be protected. In Figures 2 and 3, the outer and inner pipes are shown to be mounted in concentric relationship but it should be clear that exact concentricity is not requisite throughout the length of the outer pipe and, in fact, the pipe structure can be assembled and subsequently bent in any desired manner, as suggested in Figure 1, without destroying the continuity of the intermediate space 33, which in this instance becomes wider at one side than at the other due to the relative axial displacement of the pipes effected by bending.

The ends of the inner and outer pipes are preferably retained in end fittings 35 and 36, the former being shown in section in Figures 2 and 3. Each fitting includes a male member 37 threaded into a female member 38, the latter providing a bore receiving the outer pipe 25 which is thereafter flared, as indicated by the numeral 39, to be pressed between correspondingly angled shoulders of the members 37 and 38 to form a fluid-tight seal. The male member 37 provides a bore 40 somewhat larger in diameter than the external surface 32 of the inner pipe 30 to provide an annular space 41 surrounding this pipe. The end of the inner pipe 30 extends into a threaded counterbore 42 of the male member 37 and is therein flared, as indicated by the numeral 43, to correspond to a flaring shoulder 44 at the innermost end of the counterbore. A coupling member 45 is threaded into the counterbore 42 and provides a forward surface 46 corresponding in taper to the flared portion of the inner pipe 30, whereby this flared portion is clamped in fluid-tight relationship between the coupling member 45 and the flaring shoulder 44 of the male member 37. The end fitting 36 is similarly formed.

The coupling member 45 connects with an electromagnetic valve 48 of the normally-open type, shown very diagrammatically as including a seat 49 and a movable valve member 50 urged resiliently downward by a compression spring 51. The upper end of the valve stem provides an armature 52 which is drawn upward to close the valve upon energization of the solenoid winding 53. It will be understood that this showing of the valve 48 is purely diagrammatic and that, in this embodiment of the invention, any electrically-operated valve may be employed without departing from the spirit of the invention.

The function of the valve 48 is to control the flow of fluid, in this instance fuel, from any suitable fluid-conducting means 54 which, in the illustrated embodiment, may well comprise a preliminary or unprotected portion or fitting of the main or auxiliary fuel lines shown in Figure 1. I prefer to dispose the valve 48 at the inlet end of the system to be protected and to employ a normally-open valve which quickly closes upon puncture of either or both of the pipes 25 or 30, as will be hereinafter explained. However, it should be understood that this valve may be placed at any desired point in the system, whether it be ahead of, beyond, or between the ends of the protected section. However, its employment at the intake end is very advantageous as shutting off the supply of fuel and thus tending to minimize wastage as well as to reduce fire hazard.

In this embodiment of the invention, it is desired to maintain a pressure differential across the wall of the outer pipe 25 during normal operation of the system. This may be accomplished by maintaining the pressure in the space 33 either above or below the atmospheric pressure applied to the exterior of this outer pipe. For reasons to be hereinafter mentioned, I prefer to maintain this pressure above atmospheric in the fuel-line protection system.

To accomplish this result, a pipe 55 is threaded into the male member 37 to communicate with the annular space 41 and thence with the intermediate space 33 which, of course, is sealed by the members 45 in the fittings 35 and 36. The pipe 55 extends to a tee 56 and any suitable superatmospheric pressure may be built up in the intermediate space 33, as by attaching a pressure pump to a check-fitting 57 threaded into the tee 56, the pressure at all times being indicated by a pressure gauge 58.

Figure 2 also shows an auxiliary source of pressure for the intermediate space 33 comprising a pressure-storage container 60, preferably filled with a fire-extinguishing fluid under pressure, such, for example, as a tank of carbon dioxide. This container may be equipped with the usual manual valve and pressure gauge and pressure regulator, and its function is to supply to an electric valve 61 an additional amount of fluid to be transmitted to the intermediate space 33 when the valve 61 opens. It may also be used to establish the desired pressure differential across the wall of the outer pipe 25 and, if desired, it may serve the very desirable function of normally maintaining the pressure in the intermediate space 33 by leakage through the valve 61 to compensate for very slow leaks which might relieve this pressure.

As diagrammatically shown in Figure 2, the valve 61 is electrically operated and is constructed similar to the valve 48 except that it is of the normally-closed type, being held closed by a compression spring 62. Energization of a solenoid winding 63 moves a valve member 64 from its seat and permits flow of fluid from the container 60 into the pipe 55 and the intermediate space 33 at a rate controlled by the valve 61, as well as by any auxiliary valve means and/or pressure regulator 90 associated with the container 60.

The invention comprehends the employment of means responsive to changes in the pressure differential across the wall of one or the other, or both, of the pipes 25 or 30. In the embodiment of Figure 2, the pressure differential to be particularly discussed is between the space 33 and the surrounding atmosphere, though it should be apparent that a pressure differential may, and usually does, exist between the space 33 and the inner space or chamber 34. To detect changes in the first-named pressure differential, I employ a suitable differential-pressure means exemplified by a bellows 68 providing a closed internal space communicating with the intermediate space 33 through the annular space 41 and a nipple 69 threaded into the male member 37. The exterior of the bellows 68 is protected by a casing 70 vented at 71 to be influenced by the prevailing atmospheric pressure.

An electric switch 72 is mounted on the casing 70 to provide a stem 73 urged by a spring 74 into contact with the upper end of the bellows 68. This stem carries a contact member 75 which bridges upwardly-facing contacts 76 and 77 when the pressure in the intermediate space 33 is reduced to such an extent that the pressure differential across the wall of the outer pipe 25 is lowered a predetermined extent. The contacts 76 and 77 are connected to one conductor 78 of the incoming line, the other conductor being indicated by the numeral 79. If the switch 72 is closed, current flows therethrough to a conductor 80 to energize the solenoid windings 53 and 63 which are connected across the conductors 79 and 80. Likewise connected thereacross is an indicating means 81, shown as comprising a lamp, and a warning signal 82, shown as comprising a bell, whereby both visual and audible warnings will be given.

The operation of the system shown in Figure 2 is as follows. With the pressure in the space 33 built up to a value substantially higher than the surrounding atmospheric pressure and sufficient to maintain the switch 72 open, the system is automatically protected against disastrous results upon puncture. Such superatmospheric pressure in the space 33 will expand the bellows 68 and keep the switch 72 open. It will also maintain a pressure differential across the wall of the outer pipe 25 and usually also across the wall of the inner pipe 30 so that an opening in the outer pipe or in both pipes will upset the pressure differential imposed on the bellows 68 and thereby close the switch 72. Should a bullet pierce the outer pipe 25, or both the outer and inner pipes 25 and 30, the pressure in the intermediate space 33 will immediately drop and the pressure differential previously maintained across the wall of the outer pipe 25 will be reduced to such an extent as to close the switch 72. This simultaneously energizes the solenoid windings 53 and 63 to close off the incoming fuel line and to open the valve 61 to supply fire-extinguishing fluid to the pipe 55 to flow along the intermediate space 33 to the point of puncture where it is available to mix with any fuel which has escaped from the inner pipe and avoid danger of combustion or to extinguish any fire which has already started, as, for example, if the puncture were made by an incendiary bullet. At the same time, audible and visual warnings are given to inform the pilot or operator as to what has happened and permit switching to auxiliary fuel lines.

It is often preferable to fill preliminarily the intermediate space 33 with the fire-extinguishing fluid so that it is immediately available to extinguish an existing fire and prevent formation of a combustible mixture. This can be readily accomplished by pressuring the intermediate space 33 from the container 60 or by supplying the fire-extinguishing fluid to the intermediate space 33 through the check-fitting 57. The employment of an auxiliary supply of the fire-extinguishing or other fluid from the container 60 is optional. If used, it is, of course, desirable that the pressure in the intermediate space 33 adjacent the annular space 41 should not be built up to reopen the switch 72. There is usually no difficulty in this connection as puncture of the outer pipe 25 will readily permit escape of the newly-supplied fire extinguishing fluid without developing a sufficient pressure within the bellows 68 to operate the switch 72. Of course, the pressure in the bellows is dependent upon the rate of auxiliary supply, which is, in turn, controlled by the valve 61, any manual valve associated with the container 60, or any pressure regulator associated therewith, such as the pressure regulator 90 of Figure 2, as well as by the throttling action of the pipe 55. It should also be understood that it is not essential to introduce the auxiliary supply adjacent the annular space 41 and that the pipe 55 may communicate with the intermediate space 33 at any position therealong or through the fitting 36.

Figure 4:
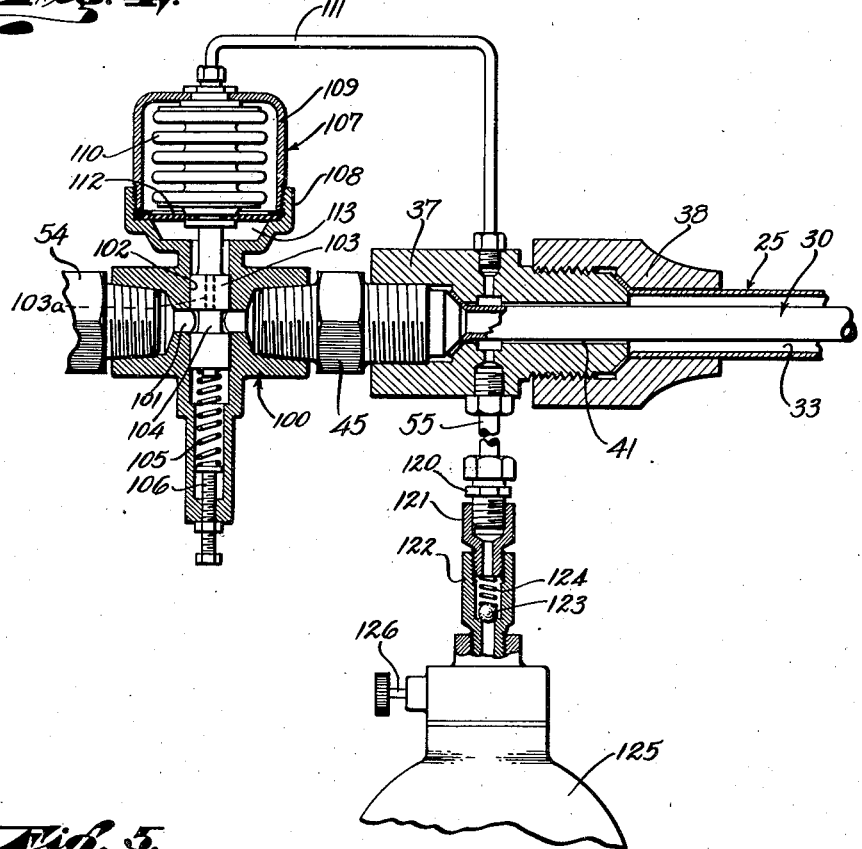
Figure 4 is an enlarged sectional view of the form of the invention exemplified in Figure 1 equipped, in addition, with an auxiliary supply means for fire-extinguishing fluid.

Figure 4 shows a non-electrical protective system which is somewhat simpler than that shown in Figure 2. Here, a pressure-operated valve 100 is disposed between the fluid-conducting means 54 and the coupling 45, and includes a passage 101 through which the fuel is normally conducted to the inner pipe 30. Traversing this passage is a bore 102 slidably receiving a valve member 103 having a reduced diameter portion 104 providing a space through which the fuel may freely flow when the valve member is in the position shown in Figure 4. Upon either a raising or lowering of the valve member, the normal-diameter portions thereof will traverse the passage 101 to shut off the supply of fuel to the inner pipe 30.

The position of the valve member 103 is determined by the joint action of a compression spring 105, adjustable by a screw 106, and a pressure-responsive device 107. As diagrammatically shown in Figure 4, this pressure-responsive device includes a base 108 threadedly receiving a cap 109 to provide a housing which encloses a bellows 110 closed at its lower end and open at its upper end to a pipe 111. The lower end of the bellows is connected to a flexible diaphragm 112 formed of fuel-resistant rubber or other flexible material, this diaphragm being clamped between the base 108 and the cap 109. A sealed chamber 113 is thus formed below the diaphragm 112 and the valve member 103 is usually provided with sufficient clearance to permit maintenance of this chamber 113 at the pressure of the incoming fuel, namely, a pressure substantially corresponding to that inside the inner pipe 30. A substitute for such clearance is indicated as a duct 103a extending longitudinally through the corresponding large portion of the valve 103. This pressure is usually low and the resulting upward pressure on the lower end of the bellows 110 is correspondingly low. On the other hand, the interior of the bellows 110 is maintained at the relatively high pressure in the intermediate space 33 through a connection of the pipe 111 to the annular space 41, as shown. Correspondingly, the pressure differential across the wall of the inner pipe 30 is transmitted to the pressure-responsive means 107. The compression spring 105 is so adjusted that the valve member 103 remains in the position shown so long as the normal pressure differential exists. However, upon puncture of the inner pipe 30 or the outer pipe 25, or both, the pressure in the bellows 110 falls and the spring 105 forces the valve member 103 upward to close the supply of fuel.

The intermediate space 33, in the embodiment shown in Figure 4, may be pressured by any suitable means. In this embodiment, the pipe 55 is shown as connected to a nipple 120 and thence through a nipple 121 to a check valve 122 including a ball 123 in contact with a compression spring 124. The corresponding check valves 122 shown in Figure 1 are threaded directly into the male member 37 and serve for pressuring the system. The simplified system shown in Figure 1 is entirely satisfactory in certain instances where a prolonged flow of fire-extinguishing or other fluid is not to be supplied to the intermediate space 33, yet where it is desired to shut off the flow through the inner pipe 30 upon puncture thereof.

In the event that it is desired to employ a directly connected source of pressure, either for preliminary pressuring or for prolonged flow of fluid to the intermediate space 33 upon puncture of the inner pipe 30, the lowermost end of the check valve 122 may be attached to a suitable pressure source, such, for example, as a pressure container 125 containing a fire-extinguishing fluid and equipped with a manual pressure valve 126. A suitable pressure regulator may be employed, if desired, but this is usually unnecessary as the check valve 122 can be designed to close before the pressure in the intermediate space 33 corresponds to any excessively high internal pressure of the container 125 which might injure the pipes 25 or 30. In this connection, it will be apparent that opening of the manual valve 126 will apply a superatmospheric pressure to the intermediate space 33. In accomplishing this, fluid will flow from the container through the check valve 122 only so long as the fluid pressure on top of the ball 123, aided by the downward force of the compression spring 124, is less than the pressure supplied by the container. As soon as these pressures become equal, the ball 123 will rest against its seat, provided by the check valve 122, and additional fluid will move from the container 125 only to compensate for slow leaks or upon puncture of either of the pipes 25 or 30. As previously mentioned, if this puncture is by way of an incendiary bullet, the resulting fire will be quickly extinguished by an additional supply of fire-extinguishing fluid from the container 125.

It will be quite apparent that, if no auxiliary supply of pressured fuel is employed (as is exemplified in Figure 1 or by omitting the container 125 of Figure 4), such systems can be made to operate if the pressure differential is maintained by imposing a partial vacuum on the intermediate space 33 to establish a pressure differential across the wall of the inner pipe 30. In this instance, the spring 105 will be a tension spring tending to draw the valve member 103 downward, this tendency being balanced by the vacuum transmitted to the interior of the bellows 110, thus holding the valve 103 in the position shown. Upon puncture of the inner pipe 30 to destroy this vacuum, the tension spring 105 will immediately draw the valve member downward to close off the fuel supply.

Figure 5:
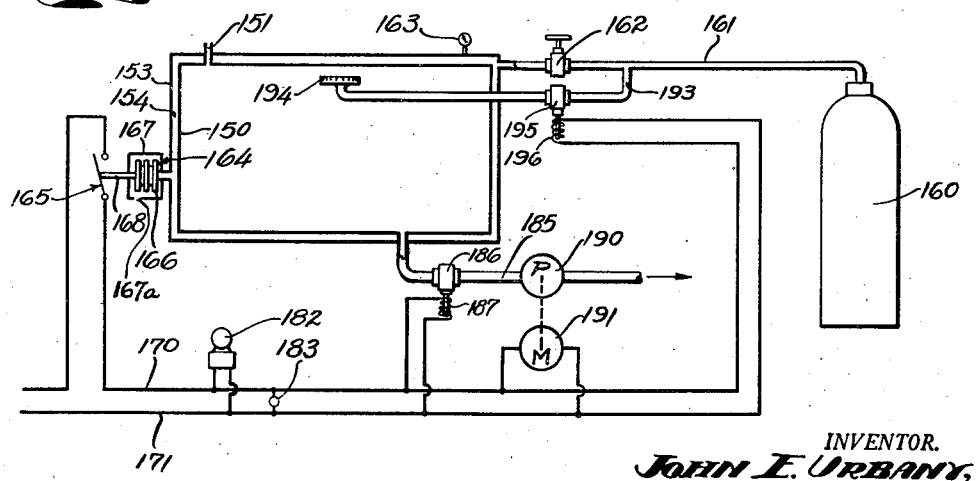
Figure 5 is a diagrammatic view illustrating a method of protecting storage containers.

In the embodiment diagrammatically shown in Figure 5, the invention is applied to the protection of a container such as a large fuel storage tank or container 150, shown in section and being provided with a vent 151. Surrounding all or that portion of the container which is to be protected is an outer shell or container 153 spaced from the container 150 to define an intermediate space 154. A pressure differential is maintained across the walls of one or the other of the containers and is destroyed by puncture of this wall. Such a system is exemplified in Figure 5 by means for entrapping a fluid in the intermediate space 154 which is above the atmospheric pressure surrounding the outer container 153 so that a pressure differential is developed across the wall of this container, it being clear that a vacuum can be supplied to this intermediate space to maintain normally this pressure differential. In the system shown, the intermediate space 154 is pressured from a pressure container 160 which, in protecting inflammable fluid, may well contain a fire-extinguishing fluid such as carbon dioxide. The pressure is supplied to the intermediate space 154 through a pipe 161 equipped with a manual valve 162, the pressure being indicated by a gauge 163.

A pressure-responsive means 164 is made responsive to changes in the differential pressure across the wall of the container 153 to actuate a switch 165. This pressure-responsive means may include a bellows 166 communicating internally with the intermediate space 154 and communicating externally with the atmosphere by suitable venting of an enclosure 167 as through a port 167a. The closed left-hand end of the bellows 166 carries a stem 168 operatively connected to the switch 165. As shown, this switch is retained open during the time that the normal pressure differential exists but closed upon puncture of either or both of the containers 150 or 153.

Closing of the switch 165 energizes conductors 170 and 171 to actuate various warning or control devices. For example, it may give an audible warning by energizing a bell 182 or a visual warning by energizing a lamp 183, each connected between the conductors 170 and 171. In many instances, it is desirable upon such puncture to effect drainage of the fuel from the container 150. For this purpose, a fluid-conducting means in the form of a pipe 185 is employed, together with an electromagnetic valve 186 provided with a solenoid winding 187 connected between the conductors 170 and 171. This valve, normally closed, is thus opened upon closing of the switch 165 to permit drainage of the contents of the inner container 150. If this drainage is to be accelerated by a pumping action, a pump 190 may be imposed in the pipe 185, being operatively connected to a motor 191 which is connected across the conductors 170 and 171 to be energized at the same time that the valve 186 opens.

In the event of puncture, it is often desirable to supply a fire-extinguishing fluid to the interior of the container 150 to prevent or extinguish fire. In accomplishing this result, a pipe 193 communicates with the pipe 161 and supplies fire-extinguishing fluid to one or more discharge devices 194, as controlled by an electromagnetic valve 195. This valve includes a solenoid winding 196 connected across the conductors 170 and 171 to open the valve upon destruction of the pressure differential resulting from the puncture of one or both containers. The resulting flow of fire-extinguishing fluid is distributed to the interior of the container 150 and will serve to blanket any inflammable fluid therein to extinguish or prevent fire.

While the invention has been illustrated with reference to protective systems for fuel lines or containers, it should be quite clear that its utility is not limited thereto. It is applicable to all stationary or movable installations containing fluids which should not be allowed to ecsape other than through normal outlets, and these fluids may be stationary or moving with respect to their containers. In addiiton to the applications previously mentioned, the present invention finds utility in such uses as protecting or detecting leaks in lines, pipes, or conduits, whether above or below the surface of the earth and whether they are partially or completely filled with moving or stationary fluids. Another particularly advantageous use is in the protection of high-pressure hydraulic lines controlling motion at, or transmitting pressure to, a remote point. Puncture of such hydraulic lines will ordinarily cause drainage of the high-pressure fluid. This can be prevented, and leaks can be detected, by use of the present invention. For example, in a hydraulic system providing a plurality of lines extending from a common source to a plurality of positions, the invention can be installed in each of the lines to be protected so that puncture of any line will automatically close a valve in this line and prevent drainage of the hydraulic system. Various other applications of the invention will be apparent to those skilled in the art.

It will also be clear that various controls or warnings can be made responsive to a change in the differential on puncture of a wall across which the pressure differential is established. While electric or pressure-actuated devices have been shown as the interconnection between the devices responsive to differential pressure and the control or warning means, it is, of course, possible to use various other interconnecting systems, whether operated by mechanical, electrical, hydraulic, or other means.

Also, it is not essential in all instances to use automatic controls serving, for example, to shut off a supply of fluid or to deliver a prolonged flow of auxiliary fluid to the point of puncture. For example, in Figure 2, even if the corresponding controls are eliminated and a fluid, e. g., a fire-extinguishing fluid such as carbon dioxide, is entrapped in the intermediate space 33, puncture of the inner pipe 30, or of both the inner and outer pipes, will cause mingling of the fluids in the inner space 34 and the intermediate space 33. Even a momentary surge of a fire-extinguishing fluid to mix with escaping fuel will often be sufficient to extinguish a fire established, for example, by an incendiary bullet, and the operator or pilot can manually control the fuel flow to prevent excessive drainage or a later-prevalent fire hazard.

It will be clear from the exemplary embodiments shown that the invention comprehends a first space, for example, the space 34 within the inner pipe 30, and a second space separated therefrom, as by an impervious wall, for example, the intermediate space 33, usually employed in association with a third space, usually separated from the second space by an impervious wall, which third space, for example, may be the space occupied by the surrounding atmosphere exterior of the outer pipe 25. Normally, a pressure differential is established across one of these walls. This difference in pressure results in a difference in absolute pressure between the contiguous spaces and, thus, may represent a difference in superatmospheric pressures, a difference in subatmospheric pressures, or a difference between a subatmospheric pressure and a superatmospheric pressure. Nor is it necessary that one of the spaces represent a central space surrounded by another or both of the other spaces, though this is often desirable as providing more complete protection. Nor is it necessary for all purposes that any particular space contain any particular fluid for, in the embodiments shown, it is, of course, immaterial for some purposes whether the fuel, for example, is contained within the innermost space or within the intermediate space. Nor is it necessary that the pressure differential be maintained across any particular one of the intervening walls. Thus, for example, in Figure 2, the pressure-responsive device is responsive to changes in pressure differential across the wall of the outer pipe 25, while, in Figure 4, it is responsive to a similar change across the wall of the inner pipe 30.

Various changes and modifications can be made without departing from the spirit of the invention as defined in the appended claims.

I claim as my invention:

1. In combination: means defining first and second spaces and including an impervious intermediate wall separating said spaces and an impervious outer wall separating said second space from the surrounding atmosphere; means for delivering an inflammable fluid to said first space; means for normally maintaining a fire-extinguishing fluid in said second space at such pressure as to maintain a pressure differential across one of said walls, which pressure differential is modified upon puncture of said one of said walls, said means including a source of said fire-extinguishing fluid under pressure and a spring-loaded valve connecting said source to said second space to maintain in said second space a pressure lower than in said source; and means responsive to a change in said pressure differential across said one of said walls upon puncture thereof for actuating said valve.

2. In combination: means defining first and second spaces and including an impervious intermediate wall separating said spaces and an impervious outer wall separating said second space from the surrounding atmosphere, said spaces being adapted to contain two fluids; fluid-conducting means communicating with one of said spaces; a control means comprising an electrically-actuated valve associated with said fluid-conducting means for controlling the flow of fluid therethrough; means for conducting fluid into the other of said spaces; means for normally maintaining the fluid in said second space at such pressure as to maintain a pressure differential across one of said walls, which pressure differential is modified upon puncture of either of said walls; a pressure-operated electric switch responsive to a change in said differential pressure; and circuit means for operatively connecting said pressure-operated switch to said electrically-actuated valve for closing said valve upon puncture of either of said walls.

3. In combination: means defining inner and outer spaces and including an impervious intermediate wall separating said spaces and an impervious outer wall separating said outer space from the surrounding atmosphere; fluid-conducting means communicating with said inner space; a control means comprising a normally-open electrically-actuated valve associated with said fluid-conducting means for controlling the flow of fluid therethrough; means for delivering a dissimilar fluid to said outer space and for normally maintaining the pressure in said outer space such as to maintain a pressure differential across one of said walls, which pressure differential is modified upon puncture of said one of said walls; and pressure-responsive means for operating said control means to close said valve in response to a change in said differential pressure upon puncture of said one of said walls, said pressure-responsive means including a bellows providing two sides, one side being exposed to the pressure of said dissimilar fluid in said outer space and the other side being exposed to atmospheric pressure, said pressure-responsive means also including an electric switch operatively connected to said bellows and electrically connected to said electrically-actuated valve to close said valve upon puncture of said one of said walls.

4. In combination: an outer pipe; an inner fluid-conducting pipe extending through said outer pipe and of such size as to provide an intermediate space between said pipes; means for entrapping a fluid in said intermediate space under such pressure as to maintain a pressure differential across the wall of one of said pipes, said means including a pressure source of supply of said fluid and a pressure-reducing valve for maintaining the pressure in said intermediate space lower than the pressure of said source and for renewing the supply of such fluid to said intermediate space upon puncture of the wall of said one of said pipes; means for delivering a stream of fluid to the interior of said inner pipe to flow therethrough, said means including a control valve for controlling the flow of such fluid; and means responsive to a change in said pressure differential across the wall of said one of said pipes upon puncture thereof for actuating said control valve.

5. In combination: means defining first and second spaces and including an intermediate wall separating said spaces and an outer wall separating said second space from the surrounding atmosphere; a first fluid-conducting means for delivering fluid to said first space and including a valve means controlling the flow of fluid thereto; a second fluid-conducting means for delivering fluid to said second space and including a valve means controlling the flow of fluid thereto; means for normally maintaining fluid in one of said spaces under such pressure as to maintain a pressure differential across one of said walls, which pressure differential is modified upon puncture of said one of said walls; means responsive to a modification of said differential pressure across said one of said walls upon puncture thereof; and means for operatively connecting said last-named means to both of said valve means to actuate same upon occurrence of such puncture.

6. In combination: means defining first and second spaces and including an intermediate wall separating said spaces and an outer wall separating said second space from the surrounding atmosphere; a first fluid-conducting means for delivering fluid to said first space and including a first normally-open valve means for controlling the flow of fluid thereto; a second fluid-conducting means for delivering fluid to said second space and including a second normally-closed valve means for controlling the flow of fluid thereto; means for normally maintaining fluid in said second space under such pressure as to maintain a pressure differential across each of said walls, which pressure differential is modified upon puncture of either of said walls; means responsive to a modification of said differential pressure across either of said walls upon puncture thereof; and means for operatively connecting said last-named means to said first and second valve means to move said first valve means toward closed position and said second valve means toward open position upon occurrence of such puncture.

7. In combination in a fire-prevention system: an inner pipe providing an inner space; an outer pipe surrounding said inner pipe and providing a closed intermediate space therebetween; means for supplying an inflammable fluid to said inner space; a source of fire-extinguishing fluid under pressure; means for supplying fire-extinguishing fluid to said closed intermediate space from said source thereof and for normally maintaining the fire-extinguishing fluid in said intermediate space under pressure substantially greater than the pressure of said inflammable fluid whereby puncture of said inner pipe will cause mingling of said fire-extinguishing fluid with said inflammable fluid, said last-named means including a valve controlling the supply of said fire-extinguishing fluid from said source to said intermediate space; a pressure-responsive means responsive to changes in pressure between said intermediate space and the surrounding atmosphere; and means operatively connecting said pressure-responsive means to said valve means to supply additional fire-extinguishing fluid to said intermediate space upon puncture of said outer pipe.

8. In combination: a fitting comprising a front member and a rear member respectively providing openings; an outer pipe extending into said fitting through the opening of said front member and sealed in fluid-tight relationship with said front member; an inner pipe extending into said fitting inside said outer pipe and cooperating with said outer pipe in defining an outer space, the interior of said inner pipe providing an inner space, said inner pipe extending into said opening of said rear member and having an external diameter smaller than said opening of said rear member to provide an annular passage around said inner pipe, said annular passage communicating with said outer space; means for closing the rear portion of said annular passage; means communicating with said outer space for normally maintaining a pressure differential across the wall of one of said pipes; a valve controlling the flow of fluid through said inner space; control means communicating with said annular passage and responsive to said pressure differential; and means for operatively connecting said control means to said valve to actuate said valve upon a change in said pressure differential when said one of said pipes is punctured.

9. A combination as defined in claim 8, in which said means communicating with said outer space comprises a source of fluid and means connecting said source to communicate with said outer space, said last-named means including a valve means responsive to a change in said differential pressure for supplying additional fluid to said outer space.

10. A combination as defined in claim 8, in which said means communicating with said outer space comprises a source of fluid and means connecting said source to said annular passage to maintain normally therein a pressure greater than the pressure around said outer pipe whereby more fluid is delivered to said outer space through a portion of said annular passage upon puncture of said outer pipe, the cross-sectional area of said annular passage being such as to prevent said source from building up a pressure in said annular passage sufficiently high to operate said valve upon puncture of said one of said pipes.

11. In combination: means defining first and second spaces and including an impervious intermediate wall separating said spaces and an impervious outer wall separating said second space from the surrounding atmosphere; means for delivering an inflammable fluid to said first space; means for delivering a fire-extinguishing fluid to the said second space at such pressure as to maintain a pressure differential across each of said walls, said means including a source of fire-extinguishing fluid and a valve controlling the flow of fire-extinguishing fluid from said source to said second space; means responsive to a change in said differential pressure across either of said walls upon puncture thereof; and means operatively connecting said last-named means and said valve to open said valve upon such puncture to supply additional fire-extinguishing fluid to said second space.

12. In combination: an inner pipe providing an inner space; an outer pipe providing an outer space around said inner pipe; a fitting receiving adjacent ends of said pipes for retaining said adjacent ends in concentric relationship, said fitting providing a passage communicating with said inner space; valve means connected to said fitting for controlling fluid flow through said passage and said inner space, said valve means providing a body connected to said fitting and having a fluid-conducting bore and a transverse valve bore therein, a passaged valve member slidable in said transverse valve bore to move from a valve-opening position to a valve-closing position and vice versa, resilient means biasing said valve body toward valve-closing position; and means for normally maintaining a fluid in said outer space under such pressure as to maintain a pressure differential across the wall of one of said pipes and responsive to change in said pressure differential upon puncture of the wall of said one of said pipes for operating said valve means to control the flow of fluid through said passage and said inner space, said fluid pressure maintaining means comprising bellows responsive to said differential pressure and operatively connected to said valve member to hold the same in valve-opening position only so long as said normal pressure differential is maintained.

13. In combination in a fire-prevention system; an inner housing providing an inner space; an outer housing surrounding said inner housing and providing a closed intermediate space between said housings; means for supplying fire-extinguishing fluid to said closed intermediate space and normally maintaining the fire-extinguishing fluid in said intermediate space under pressure, said last named means including a normally closed first valve controlling the supply of said fire extinguishing fluid to said intermediate space; means for supplying an inflammable fluid to said inner space and including a normally open second valve, said means for supplying said inflammable fluid being adapted to maintain a pressure differential across one of said housings; means responsive to modification of said differential pressure; and means operatively connecting said last mentioned means to said first and second valves to move said first valve toward open position and to move said second valve toward closed position upon change in said differential pressure.

14. In combination: an inner pipe providing an inner space; an outer pipe providing an outer space around said inner pipe; a fitting receiving adjacent ends of said pipes for retaining said adjacent ends in concentric relationship, said fitting providing a passage communicating with said inner space; valve means connected to said fitting for controlling fluid flow through said passage and said inner space, said valve means providing a body connected to said fitting, said body having a fluid-conducting bore and a transverse valve bore therein; a passaged valve member slidable in said transverse valve bore to moe from a valve-opening position to a valve-closing position and vice versa; resilient means biasing said valve body toward valve closing position; means for normally maintaining a fluid in said outer space under such pressure as to maintain a pressure differential across the wall of one of said pipes; a bellows responsive to said pressure differential and operatively connected to said valve member to hold the latter in valve-opening position only so long as normal pressure differential is maintained; and means responsive to a change in said pressure differential upon puncture of the wall of said one of said pipes for operating said valve means to control the flow of fluid through said fitting passage and said inner space.

JOHN E. URBANY.